(12) United States Patent
Dedering

(10) Patent No.: US 9,808,742 B2
(45) Date of Patent: Nov. 7, 2017

(54) FILTER ARRANGEMENT

(71) Applicant: IBS Filtran Kunststoff-/Metallerzeugnisse GmbH, Morsbach (DE)

(72) Inventor: Michael Dedering, Morsbach (DE)

(73) Assignee: IBS Filtran Kunststoff-/Metallerzeugnisse GmbH, Morsbach (DE)

( * ) Notice: Subject to any disclaimer, the term of this patent is extended or adjusted under 35 U.S.C. 154(b) by 645 days.

(21) Appl. No.: 13/661,513

(22) Filed: Oct. 26, 2012

(65) Prior Publication Data

US 2013/0118964 A1    May 16, 2013

(30) Foreign Application Priority Data

Oct. 28, 2011  (DE) ............... 10 2011 117 163

(51) Int. Cl.
*B03C 1/30* (2006.01)
*B01D 29/01* (2006.01)
*B01D 29/56* (2006.01)
*B01D 35/06* (2006.01)

(52) U.S. Cl.
CPC ............ *B01D 29/01* (2013.01); *B01D 29/56* (2013.01); *B01D 35/06* (2013.01); *B03C 1/30* (2013.01); *B01D 2201/04* (2013.01)

(58) Field of Classification Search
CPC ......... B03C 1/0332; B03C 1/035; B03C 1/28; B03C 1/286; B03C 1/30; B03C 2201/18; B03C 2201/20; B03C 2201/30; B01D 29/01; B01D 29/56; B01D 35/06; B01D 2201/04; B01D 2201/0407; B01D 2201/0415; F01M 1/10; F01M 2001/1042; F01M 2001/1057
USPC .................................. 210/222, 223
See application file for complete search history.

(56) References Cited

U.S. PATENT DOCUMENTS

| | | | | |
|---|---|---|---|---|
| 2,149,764 A | * | 3/1939 | Frei ............................... | 210/223 |
| 2,943,739 A | | 7/1960 | Maynard | |
| 3,127,255 A | * | 3/1964 | Winslow ........... | B01D 21/0009 |
| | | | | 210/130 |
| 3,679,057 A | | 7/1972 | Perez | |
| 4,026,805 A | * | 5/1977 | Fowler ..................... | B03C 1/28 |
| | | | | 209/223.1 |

(Continued)

FOREIGN PATENT DOCUMENTS

| | | |
|---|---|---|
| CN | 1514749 | 7/2004 |
| CN | 201470214 | 5/2010 |

(Continued)

OTHER PUBLICATIONS

European Search Report issued on Feb. 19, 2013 in counterpart European Application No. EP 12006494 (2 pages, in German).

*Primary Examiner* — David C Mellon
(74) *Attorney, Agent, or Firm* — Grossman, Tucker, Perreault & Pfleger, PLLC

(57) ABSTRACT

A filter arrangement for the filtration of oil or an ATF fluid, in particular a transmission oil filter, has at least a first and a second filtration layer which are arranged spaced apart by at least one spacer in a filter housing to form at least one intermediate chamber. At least one magnet or a magnet arrangement for keeping iron particles out of the oil flow are provided between the first and the second filtration layers.

10 Claims, 2 Drawing Sheets

(56) References Cited

U.S. PATENT DOCUMENTS

| | | | |
|---|---|---|---|
| 4,278,549 A * | 7/1981 | Abrams et al. | 210/695 |
| 4,304,667 A * | 12/1981 | Dubourg | B01D 35/06 210/223 |
| 4,472,275 A * | 9/1984 | Yano | B03C 1/034 210/223 |
| 4,705,626 A | 11/1987 | Morelli | |
| 5,556,540 A * | 9/1996 | Brunsting | B01D 35/06 184/6.25 |
| 5,711,871 A * | 1/1998 | Miltenyi | B01D 35/06 210/143 |
| 6,210,572 B1 * | 4/2001 | Tulchinskiy | B01D 27/06 184/6.25 |
| 7,014,772 B2 | 3/2006 | Eleftherakis et al. | |
| 7,998,347 B2 | 8/2011 | Pekarsky et al. | |
| 8,894,851 B1 * | 11/2014 | Jacobs | B01D 35/06 210/167.03 |
| 2006/0102533 A1 * | 5/2006 | Faria | 210/130 |
| 2010/0133163 A1 | 6/2010 | Tzeng et al. | |
| 2010/0147755 A1 | 6/2010 | Dedering | |

FOREIGN PATENT DOCUMENTS

| | | |
|---|---|---|
| DE | 1739101 U | 2/1957 |
| DE | 3907317 A1 | 9/1989 |
| DE | 3783487 T2 | 5/1993 |
| EP | 2133130 A1 | 12/2009 |
| EP | 2434183 A1 | 3/2012 |
| JP | S59-141294 | 9/1984 |
| WO | WO 97/22395 A1 | 6/1997 |

* cited by examiner

FILTER ARRANGEMENT

FIELD OF INVENTION

The invention relates to a filter arrangement for the filtration of oil, in particular a transmission oil filter.

BACKGROUND

Such a filter arrangement is known, for example, from EP 2 133 130 A. The transmission oil filter known from EP 2 133 130 is intended to be suitable as a suction filter. This filter is constructed as a filter according to the so-called "partial flow" principle and comprises a first filtration layer, which is in the form of an open coarse filter, and also a second filtration layer, which is in the form of a tight fine filter. The filtration layers are arranged spaced apart, with the interposition of a support grid. The transmission oil filter is constructed and designed in such a way that the oil firstly flows through the tighter filtration layer and then enters into the intermediate chambers formed between the filtration layers, and finally leaves the filtration medium via the first, less tight filtration layer. In order to ensure that oil can flow through with relatively low pressure losses even when it is cold, flow openings or flow bypasses are arranged in the tighter filtration layer. The entire arrangement, comprising two filtration layers and the frame element arranged therebetween, is usually arranged in a filter housing in such a way that the entire oil flow passes through the filter arrangement.

The engine oil circuit of motor vehicles, in particular transmission oil circuits, contains significant proportions of ferritic particles, which are normally kept out of the oil flow by means of one or more magnets. The magnets are arranged in a filter housing surrounding the filter arrangement, in such a way that the greatest possible proportion of the volumetric flow of oil flows around them.

This known magnet filter arrangement is tainted with the disadvantage that the magnets have to have a relatively high magnetic field strength, so that they can hold magnetizable particles even in the case of strong flow dynamics. This is aggravated by the fact that, in the case of cold transmission oil and a corresponding viscosity of the oil, the magnets are exposed to high shearing forces in the region of the circulating flow, and therefore this can lead to the magnets being cleaned off, with the result that the ferritic particles pass back into the oil circuit.

Magnets with an appropriately high holding force/magnetic field strength are expensive and take up a relatively large amount of space in the oil filter housing.

SUMMARY OF INVENTION

The invention is therefore based on the object of improving a filter arrangement or an engine oil or transmission oil filter of the type mentioned in the introduction in this respect. In particular, the intention is for it to be possible to effectively and permanently keep ferritic particles out of the oil flow in a manner which saves as much installation space as possible.

In some aspects, the invention relates to a filter arrangement for the filtration of oil, in particular a transmission oil filter, comprising at least a first and a second filtration layer, which are arranged spaced apart by means of at least one spacer in a common filter housing in such a way that they form at least one intermediate chamber between them.

The object on which the invention is based is achieved, in particular, by a filter arrangement for the filtration of oil, in particular by a transmission oil filter, comprising at least a first and a second filtration layer, which are arranged spaced apart by means of at least one spacer in a common filter housing in such a way that they form at least one intermediate chamber between them, wherein the filter arrangement according to the invention is distinguished by the fact that at least one magnet or a magnet arrangement for keeping iron particles out of the oil flow is provided between the first and the second filter medium.

The inventive concept can be summarized to the effect that one or more magnets are arranged in the filter housing in such a manner that they are located in regions of the filter housing in which a relatively low flow velocity and relatively weak flow dynamics prevail, such that cleaning off of the magnet or magnets which is caused by waves, sloshes or other effects of flow dynamics is not readily possible. On account of this circumstance, the magnet or a magnet arrangement can have relatively low holding forces or a relatively low magnetic field strength. Corresponding magnets require significantly less installation space, and therefore the filter arrangement as a whole can have a relatively compact structure.

In a particularly preferred variant of the filter arrangement according to the invention, it is provided that the spacer which keeps the filtration layers spaced apart itself consists of a permanent-magnetic or magnetizable material, such that separate magnet bodies do not have to be provided. This significantly increases the degree of integration of the filter arrangement according to the invention.

In an advantageous variant of the filter arrangement according to the invention, it is provided that the first filtration layer in the direction of flow has at least one flow aperture as a filter bypass, and that the magnet is arranged in a dead flow zone downstream of the flow aperture. An arrangement such as this is advantageous particularly in the case of high viscosity or in the case of low fluidity of cold oil. It is thus ensured that the viscous, cold oil flow cannot clean off the material adhering to the magnet.

It is particularly expedient if the spacer provided is at least one frame element, which is arranged between the first and the second filtration layer. The frame element can consist entirely or partially of a permanent-magnetic or magnetizable material. By way of example, the frame element can be provided with support crosspieces or nodes made of a permanent-magnetic material. Alternatively, for example, a plurality of individual pillar-like or post-like spacers made of a permanent-magnetic or magnetizable material can be connected to at least one filtration layer integrally and/or in a form-fitting manner. Alternatively, it can be provided that one or more permanent-magnetic or magnetizable elements are arranged within a frame element which defines an intermediate chamber.

Expediently, the frame element forms a plurality of intermediate chambers, wherein the first filtration layer in the direction of flow has a flow aperture in each intermediate chamber.

In a preferred variant of the filter element, the frame element is formed completely of a permanent-magnetic or magnetizable material. By way of example, the frame element can be in the form of a support grid. The flow apertures in the first filtration layer are then expediently arranged in such a way that they are oriented approximately centrally with respect to the grid windows or grid cells, such that the magnetized or magnetic grid structure is located in a dead flow zone, with respect to the apertures.

In a particularly advantageous variant of the filter element according to the invention, it is provided that the frame element is in the form of a plastic-bonded magnet. This may have been obtained, for example, from a ferromagnetic plastic by injection moulding.

The spacer or the frame element can be connected to a filtration layer in a form-fitting manner; for example, the spacer or the frame element may have been moulded onto a filtration layer.

Expediently, the first filtration layer in the direction of flow is in the form of a filter nonwoven, whereas the second filtration layer is in the form of a metal screen filter. In particular, such a screen filter can readily be encapsulated with spacers, for example a support grid, by injection moulding. Alternatively, a screen filter formed completely of plastic can be provided as the second filtration layer. Spacers can also be moulded onto such a screen filter, for example.

The object on which the invention is based is also achieved by a filter arrangement for the filtration of oil or an ATF fluid, in particular a transmission oil filter, having at least one filtration layer, which is arranged in a filter housing in such a manner that the entire volumetric flow of oil which is guided from an oil inlet to an oil outlet of the filter housing preferably flows through it, wherein the filter arrangement is distinguished by the fact that at least one restrictor having at least one flow aperture is arranged upstream of the filtration layer in the direction of flow of the oil, in such a manner that this forms at least one intermediate chamber between the filtration layer and the restrictor, and that means for magnetically keeping iron particles out of the oil flow are provided at least on that side which faces towards the first filtration layer.

This filter arrangement according to a second exemplary embodiment of the invention similarly makes use of the principle of arranging one or more magnets in the filter housing in such a manner that they are located in regions of the filter housing in which a relatively low flow velocity and relatively weak flow dynamics prevail, such that cleaning off of the magnet or magnets which is caused by waves, sloshes or other effects of flow dynamics is not readily possible.

In contrast to the first exemplary embodiment according to the invention, in the second exemplary embodiment according to the invention a restrictor in the form of a perforated plate or a grid is provided instead of the first filtration layer provided in the direction of flow. A plurality of flow apertures, which correspond in functional terms to the flow apertures in the first filtration layer according to the first exemplary embodiment, are expediently arranged in the restrictor in the form of a perforated plate. Since the restrictor is otherwise impermeable to the incident flow of oil, it is expedient to configure the flow apertures in the restrictor to be bigger than would be the case in a filtration layer.

The restrictor can consist at least partially of a permanent-magnetic or magnetizable material.

Alternatively, the restrictor itself can be in the form of a support grid for the filtration layer. As a further alternative, it can be provided that the restrictor is provided as a perforated plate with spacers for the filtration layer, i.e. a support grid or a frame element made of a magnetizable or permanent-magnet material is provided between the restrictor and the filtration layer.

The spacers, i.e. for example a support grid or frame element or else individual pillar-like elements, can consist at least partially of a permanent-magnetic or magnetizable material.

The restrictor and/or the spacers can be in the form of plastic-bonded magnets, as has been explained above in relation to the first exemplary embodiment of the invention.

BRIEF DESCRIPTION OF THE DRAWINGS

The invention will be explained hereinbelow with reference to an exemplary embodiment illustrated in the drawings, in which.

DETAILED DESCRIPTION

Figure 1:
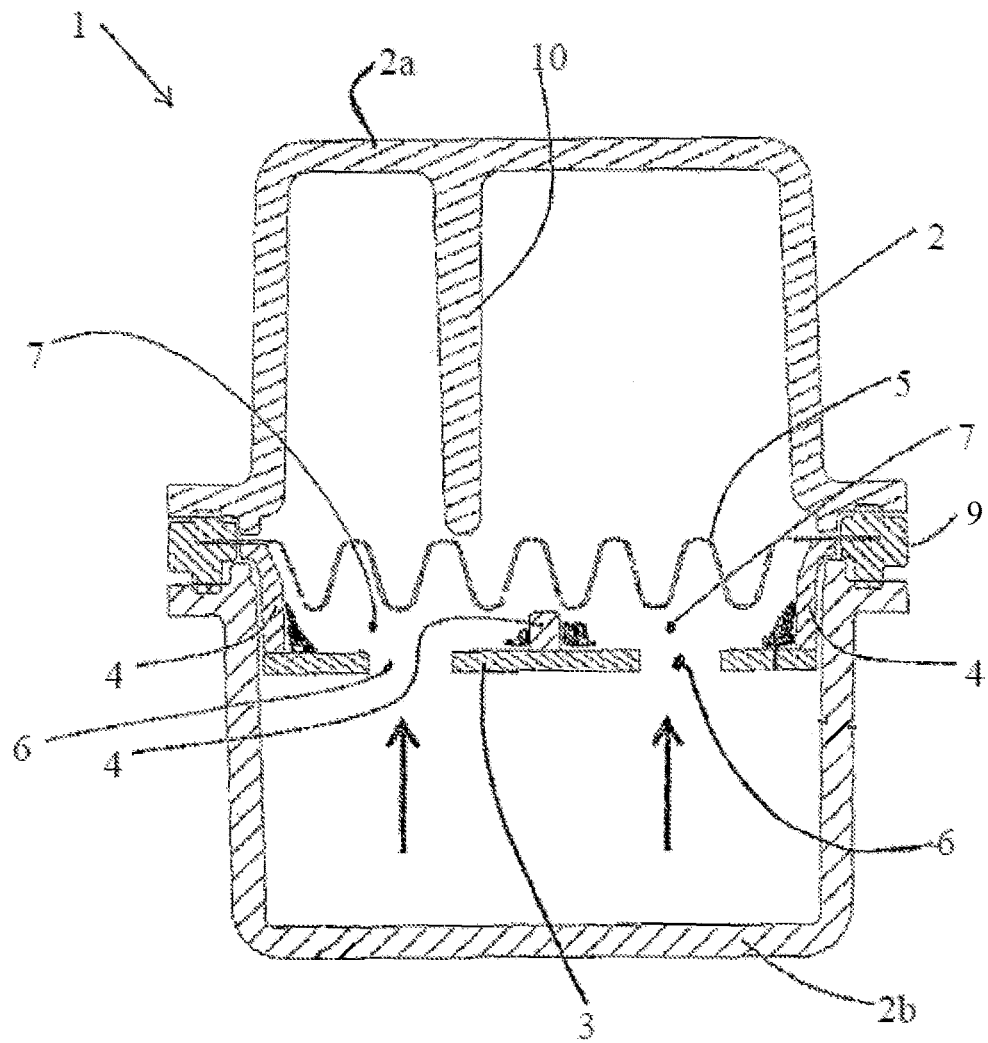
FIG. 1 shows a cross section through a transmission oil filter according to the invention.
Figure 2:
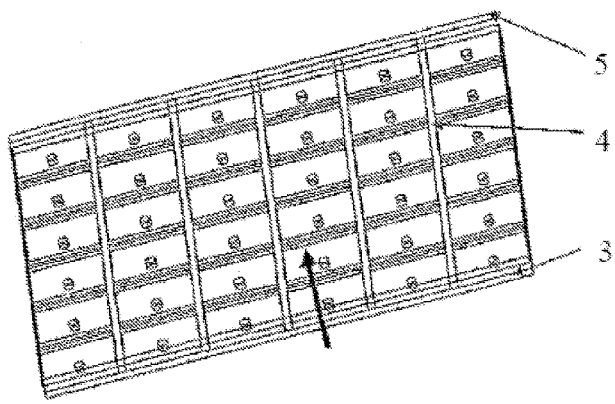
FIG. 2 shows a perspective illustration of an arrangement of the filtration layers according to the invention.
Figure 3:
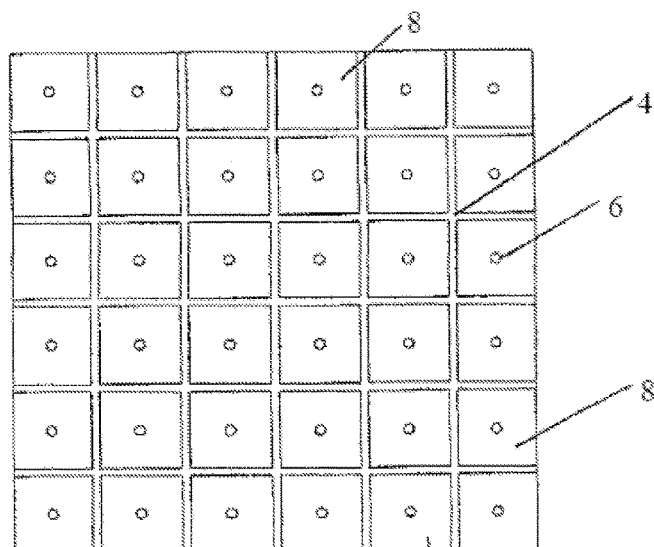
FIG. 3 shows a plan view of the arrangement of the filtration layers in FIG. 2.
Figure 4:
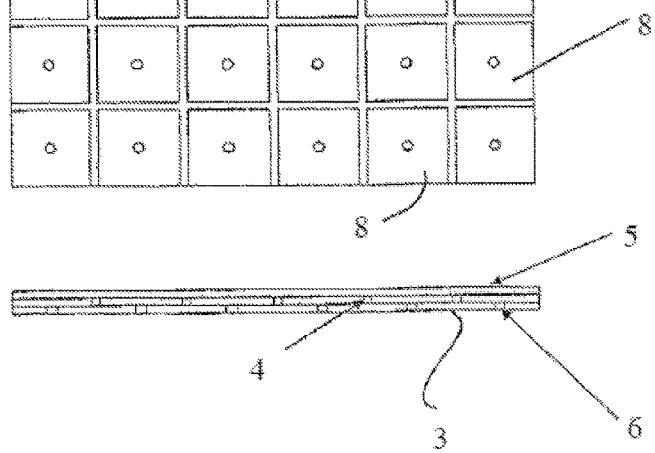
FIG. 4 shows a cross section through the arrangement of the filtration layers.

Reference is made first of all to FIG. 1, which shows a cross section through a transmission oil filter 1 according to the invention. An oil inflow and an oil outflow are not shown for reasons of simplification.

The transmission oil filter 1 comprises a filter housing 2 with two shells, an upper filter shell 2a and a lower filter shell 2b. An arrangement made up of a first filtration layer 3, a support grid 4 and a second filtration layer 5, which form a filter sandwich, extends approximately in the dividing plane of the filter housing 2.

The first filtration layer 3 in the direction of flow of the oil or of another transmission liquid (ATF) is that filtration layer which faces towards the oil flow, or the upstream filtration layer. The second filtration layer 5 is that filtration layer through which the fluid emerges.

The first filtration layer 3 can be in the form, for example, of a filter nonwoven as the ultrafine filtration medium. The second filtration layer 5 can be in the form either of a folded or planar woven filter, or of a metal screen grid.

An oil inflow or fluid inlet is provided in the lower filter shell 2b, in such a manner that the entire oil flow, as indicated by the arrows in FIG. 1, flows through the filter arrangement from sides of the first filtration layer 3. A fluid outlet is accordingly provided in the upper filter shell 2a.

As has already been mentioned in the introduction, the transmission oil filter 1 according to the invention is designed according to the "partial flow" principle. To this end, a multiplicity of flow apertures 6 formed as circular boreholes having a diameter of between 0.1 and 3 mm are provided in the first filtration layer 3. By way of the support grid 4, which is arranged downstream of the first filtration layer 3 in the direction of flow and defines an intermediate chamber 7 or a multiplicity of intermediate chambers 7, the entire filter area is divided into a multiplicity of fields 8, in each of which the flow apertures 6 are arranged centrally.

The support grid 4 and the second filtration layer 5 are provided at the edges with a common mount 9, which is clamped between the upper filter shell 2a and the lower filter shell 2b at the edges.

As already mentioned above, the entire support grid 4 is in the form of a plastic-bonded magnet, i.e. it consists of a thermoplastic material with permanent-magnetic particles embedded therein as a matrix.

The mode of operation of the transmission oil filter 1 according to the invention is as follows:

If the fluid has a low viscosity, or if the oil has a low viscosity, the flow pressure will be transmitted virtually without any losses directly into the intermediate chambers 7 through the first filtration layer 3, which is in the form of an open filter medium. The pressure in the intermediate chambers 7 is determined by the driving jet of the dynamic pressure caused by the flow apertures 6. In this state, the dynamic pressure decisively determines the negative pressure in the intermediate chamber 7. The smaller the hole, the greater the dynamic pressure and the higher the negative pressure in the intermediate chamber 7. This negative pressure in the intermediate chamber 7 ensures that the appropriate proportion of the fluid flows through the tighter filter medium of the first filtration layer 3.

If the fluid or the oil is highly viscous, the pressure will be transmitted with a relatively small loss into the intermediate chamber 7 through the first filtration layer 3. The pressure in the intermediate chamber 7 is determined by the driving jet from the flow aperture 5 and the pressure loss in the chamber. The diameter of the flow aperture 6 decisively determines the negative pressure in the intermediate chamber 7. The smaller the flow aperture 6 and the flatter the intermediate chamber 7, the higher the overall pressure loss of the filter. In this state, the first filtration layer 3 in the form of a tighter filter medium will be virtually completely bypassed.

Irrespective of the state of viscosity of the fluid, a velocity profile is established over the cross section of the driving jet through the flow aperture which is characterized in that a relatively low flow velocity prevails at the edges of the driving jet and in the region of the mount of the support grid, but a relatively high flow velocity prevails in the centre of the flow aperture 6, such that as a result the support grid 4 is arranged in a dead flow zone by virtue of the arrangement of the flow apertures 6 in the centre of the fields 7 in relation to the driving jet passing through the flow apertures 6. In this region, relatively heavy particles transported in the fluid accumulate. Such heavy particles include, by way of example, metal particles which can adhere to the magnetic support grid 4 there.

This results in the following advantages. No additional installation space is required for magnets; instead, the installation space taken up by the support grid 4 is utilized optimally. The flow conditions between the filtration layers 3 and 5 result in optimum accumulation of particles at the edges of the support grid 4. Smaller ferromagnetic particles which would otherwise not be retained are retained in the fine filter medium.

In the case of relatively high viscosities, the particles at the edges are not torn away since the fine filter medium is bypassed and virtually no flow velocity prevails there.

In addition, what arises is a strong independence from dynamic effects of the transmission liquid, for example by waves and sloshes. This also arises as a result of the fact that the upper filter shell 2a is arranged at the top in the installed position of the transmission oil filter 1, and the lower filter shell 2b is arranged at the bottom in the installed position of the transmission oil filter 1, but any sloshing movements take place at the bottom in the installed position.

No additional components are required. Since no additional magnets are required, the weight of the transmission oil filter 1 according to the invention is reduced considerably. Additional outlay on assembly is not required. Magnets which are not additionally fitted and/or provided cannot be damaged during transportation. Commercially available permanent magnets are pressed or sintered and accordingly fragile.

The reference sign 10 denotes support ribs in the upper filter shell 2a which prevent displacement of the first filtration layer 3.

The invention has been explained above with reference to an exemplary embodiment in which the filter arrangement has two filtration layers 3, 5 arranged spaced apart, wherein the first filtration layer 3 in the direction of flow comprises a relatively open filter medium and the second filtration layer 5 in the direction of flow comprises a filter medium which is tighter and finer in relation to the first filtration layer 3.

As already described in the introduction, a perforated plate having flow apertures can also be provided as a restrictor instead of the first filtration layer 3 in the direction of flow, wherein an intermediate chamber is formed between the perforated plate and the second filtration layer. Apart from that, the perforated plate can correspond approximately to the first filtration layer 3 in geometrical terms, wherein the flow apertures in the perforated plate are larger than the flow apertures in the first filtration layer. Apart from that, a support grid corresponding in nature to the support grid according to the exemplary embodiment described above can be arranged between the perforated plate and the second filtration layer. It is clear to a person skilled in the art that the second exemplary embodiment also makes use of the principle of the invention and the advantage thereof.

LIST OF REFERENCE SIGNS

1 Transmission oil filter
2 Filter housing
2a Upper filter shell
2b Lower filter shell
3 First filtration layer
4 Support grid
5 Second filtration layer
6 Flow apertures
7 Intermediate chambers
8 Fields
9 Mount
10 Support ribs

What is claimed is:
1. A filter arrangement for the filtration of oil, comprising:
a first filtration layer;
a second filtration layer; and
a spacer comprising first and second sides; and
a housing comprising an upper shell and a lower shell, the lower shell configured to receive a fluid flow and the upper shell configured to output said fluid flow;
wherein:
the spacer is in the form of a support grid comprising a plurality of grid elements;
the first side of the spacer faces the lower shell of the housing and the second side of the spacer faces the upper shell of the housing;
the first filtration layer is proximate to the first side of the spacer and the second filtration layer is proximate to the second side of the spacer, such that the first and second filtration layers are spaced apart by the spacer;
a plurality of intermediate chambers are present between the first filtration layer and the second filtration layer, each of the plurality of intermediate chambers comprising sides defined by a respective one of said plurality of grid elements, a bottom defined by said first filtration layer, and a top defined by said second filtration layer;

the first filtration layer comprises a plurality of flow apertures to serve as a filter bypass, wherein each one of said plurality of flow apertures is substantially aligned with a respective one of said intermediate chambers;

when said fluid flow is passed through said filter arrangement from said lower shell to said upper shell, a dead flow zone is present in each of said plurality of intermediate chambers, and in a region of said intermediate chamber proximate to one or more of the grid elements of said spacer;

at least the grid elements of said spacer comprise a permanently magnetic or a magnetisable material, such that when said fluid flow contains iron particles, at least a portion of said iron particles are removed from said fluid flow by the permanently magnetic or magnetisable material in said grid elements; and the spacer comprises a plastic bonded magnet.

2. The filter arrangement according to claim 1, wherein each of said plurality of flow apertures has a diameter ranging from 0.1 mm to 3 mm.

3. The filter arrangement according to claim 1, wherein the spacer consists of said permanently magnetic or magnetisable material.

4. The filter arrangement according to claim 1, wherein the spacer consists of a plastic bonded magnet.

5. A filter arrangement according to claim 1, wherein the spacer is substantially planar.

6. The filter arrangement of claim 1, wherein said permanently magnetic or a magnetis able material is present only a portion of said grid elements that is proximate a respective one of said plurality of dead flow zones.

7. A transmission oil filter, comprising:
a housing comprising an upper shell and a lower shell, the lower shell configured to receive an oil flow and the upper shell configured to output said oil flow;
a substantially planar restrictor disposed in the housing and comprising first and second sides, the first side of the restrictor facing the lower shell, said restrictor being in the form of a plate comprising a plurality of apertures;
a filtration layer disposed in the housing such that it is downstream of the second side of the restrictor and proximate to the upper shell; and
a spacer between the filtration layer and the restrictor, the spacer being in the form of a support grid comprising a plurality of grid elements;
wherein:
a plurality of intermediate chambers are present between the filtration layer and the restrictor, each of the plurality of intermediate chambers comprising sides defined by a respective one of said grid elements, a bottom defined by said restrictor, and a top defined by said filtration layer;
each of the plurality of apertures is substantially aligned with a respective one of said plurality of intermediate chambers;
at the grid elements of said spacer comprise a permanently magnetic or magnetisable material, such that when oil containing iron particles is flowed through said transmission oil filter, at least a portion of said iron particles are removed from said oil flow by the permanently magnetic or magnetisable material in said grid elements; and
the spacer comprises plastic-bonded magnets.

8. The transmission oil filter of claim 7, wherein the spacer consists of plastic bonded magnets.

9. A filter arrangement for the filtration of oil, comprising:
a first filtration layer;
a second filtration layer; and
a spacer comprising first and second sides; and
a housing comprising an upper shell and a lower shell, the lower shell configured to receive a fluid flow and the upper shell configured to output said fluid flow;
wherein:
the spacer is in the form of a support grid comprising a plurality of grid elements;
the first side of the spacer faces the lower shell of the housing and the second side of the spacer faces the upper shell of the housing;
the first filtration layer is proximate to the first side of the spacer and the second filtration layer is proximate to the second side of the spacer, such that the first and second filtration layers are spaced apart by the spacer;
a plurality of intermediate chambers are present between the first filtration layer and the second filtration layer, each of the plurality of intermediate chambers comprising sides defined by a respective one of said plurality of grid elements, a bottom defined by said first filtration layer, and a top defined by said second filtration layer;
the first filtration layer comprises a plurality of flow apertures to serve as a filter bypass, wherein each one of said plurality of flow apertures is substantially aligned with a respective one of said intermediate chambers;
when said fluid flow is passed through said filter arrangement from said lower shell to said upper shell, a dead flow zone is present in each of said plurality of intermediate chambers, and in a region of said intermediate chamber proximate to one or more of the grid elements of said spacer;
at least the grid elements of said spacer comprise a permanently magnetic or a magnetisable material, such that when said fluid flow contains iron particles, at least a portion of said iron particles are removed from said fluid flow by the permanently magnetic or magnetisable material in said grid elements; and
each of said plurality of flow apertures has a diameter ranging from 0.1 mm to 3 mm.

10. A filter arrangement for the filtration of oil, comprising:
a first filtration layer;
a second filtration layer; and
a spacer comprising first and second sides; and
a housing comprising an upper shell and a lower shell, the lower shell configured to receive a fluid flow and the upper shell configured to output said fluid flow;
wherein:
the spacer is in the form of a support grid comprising a plurality of grid elements;
the first side of the spacer faces the lower shell of the housing and the second side of the spacer faces the upper shell of the housing;
the first filtration layer is proximate to the first side of the spacer and the second filtration layer is proximate to the second side of the spacer, such that the first and second filtration layers are spaced apart by the spacer;
a plurality of intermediate chambers are present between the first filtration layer and the second filtration layer, each of the plurality of intermediate chambers comprising sides defined by a respective one of said plurality of grid elements, a bottom defined by said first filtration layer, and a top defined by said second filtration layer;

the first filtration layer comprises a plurality of flow apertures to serve as a filter bypass, wherein each one of said plurality of flow apertures is substantially aligned with a respective one of said intermediate chambers;

when said fluid flow is passed through said filter arrangement from said lower shell to said upper shell, a dead flow zone is present in each of said plurality of intermediate chambers, and in a region of said intermediate chamber proximate to one or more of the grid elements of said spacer;

at least the grid elements of said spacer comprise a permanently magnetic or a magnetisable material, such that when said fluid flow contains iron particles, at least a portion of said iron particles are removed from said fluid flow by the permanently magnetic or magnetisable material in said grid elements; and said permanently magnetic or a magnetisable material is present only a portion of said grid elements that is proximate a respective one of said plurality of dead flow zones.

\* \* \* \* \*